Dec. 13, 1960 H. RUBINSTEIN 2,964,647

DRIVER CIRCUITS

Filed March 29, 1957 2 Sheets-Sheet 1

INVENTOR
HARVEY RUBINSTEIN

BY Fred Jacob
ATTORNEY

Dec. 13, 1960 H. RUBINSTEIN 2,964,647

DRIVER CIRCUITS

Filed March 29, 1957 2 Sheets-Sheet 2

INVENTOR
HARVEY RUBINSTEIN

BY Fred Jacob
ATTORNEY

United States Patent Office 2,964,647

Patented Dec. 13, 1960

2,964,647

DRIVER CIRCUITS

Harvey Rubinstein, Lynnfield Center, Mass., assignor, by mesne assignments, to Laboratory for Electronics, Inc., Boston, Mass., a corporation of Delaware Filed Mar. 29, 1957, Ser. No. 649,428

5 Claims. (Cl. 307—88)

The present invention relates in general to new and improved transistor driver circuits, in particular driver circuits for magnetic amplifiers of the type illustrated in a copending application to Robert C. Kelner and Harvey Rubinstein entitled "Magnetic Amplifiers," Serial No. 613,705, filed October 3, 1956. The driver circuit which is used to pulse one or more magnetic amplifiers must fulfill exacting requirements, the amplitude as well as the precise time relationship of the applied pulses being important to the proper operation of the latter. One embodiment of a driver circuit which, in normal use, drives a plurality of magnetic amplifiers of the type referred to above, is illustrated in a copending application to Lester W. Allen and Harvey Rubinstein entitled, "Power Supplies for Magnetic Amplifiers," Serial No. 612,137, filed September 26, 1956. The use of tubes in this circuit, to amplify the pulses derived from the input pulse sources, necessitates relatively large amounts of power which are dissipated by the tube filaments, the plates, etc. This property detracts from the utility of the above-mentioned power supply where the saving of power is important.

The driver circuit which forms the subject matter of the present invention improves on the above mentioned power supply by eliminating certain tubes to effect a power saving, while simplifying the required circuitry. These improvements are effected by means of transistors. Each transistor is employed like a switch in the circuit between a source of negative D.C. and a core winding. Pulses derived from separate pulse sources are applied to respective transistors in order to render the latter conductive. When this occurs, the appropriate D.C. source applies a negative pulse to the magnetic core winding through the particular transistor which is conductive. When the pulse applied to the transistor by the pulse source is terminated, the transistor ceases to conduct and the negative pulse applied to the core winding is terminated. It will be understood that the output signals of respective pulse sources are synchronized to provide the appropriate driver signals for the operation of the magnetic amplifier. A simple driver circuit is thus provided which requires a minimum of power for its operation.

Accordingly, it is a primary object of this invention to provide a new and improved driver circuit for magnetic amplifiers.

It is another object of this invention to provide a simple transistor driver circuit having small operational power requirements for driving at least one magnetic amplifier.

It is a further object of this invention to prov'de a simple driver circuit for a plurality of magnetic amplifiers wherein the conductivity of the transistors interposed between the amplifiers and a D.C. source determines the driver output pulses.

It is an additional object of this invention to provide a simple driver circuit for pulsing a plurality of interconnected magnetic amnlifiers, said driver circuit employing transistors as switching elements intermediate a D.C. source and the amplifiers to apply the driving pulses.

These and other novel features of the invention, together with further objects and advantages thereof, will become more apparent from the following detailed specification with reference to the accompanying drawings in which.

Figures 1, 3:
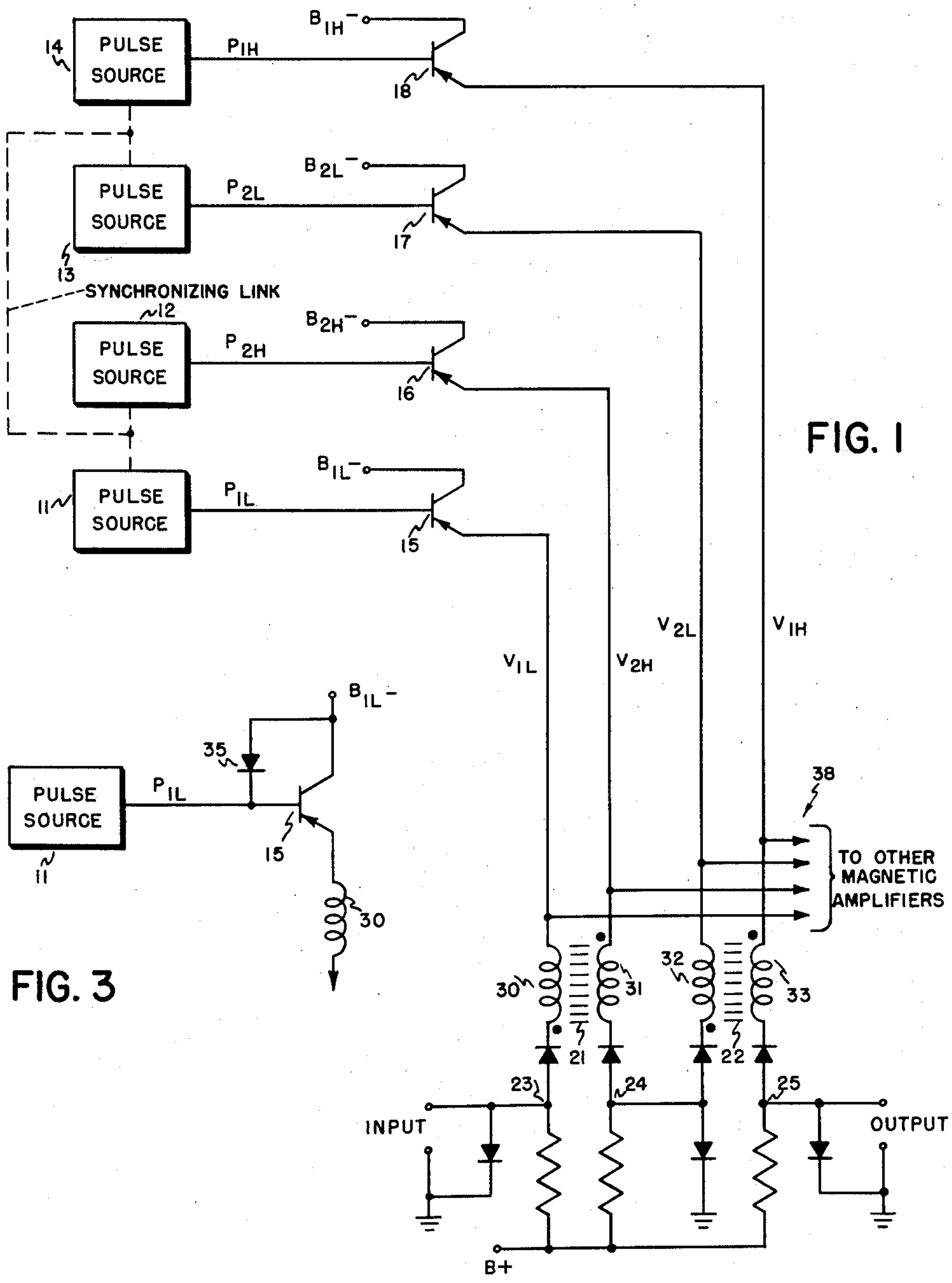
Fig. 1 illustrates the transistor driver circuit which forms the subject matter of the present invention, in cooperation with a voltage-operated magnetic amplifier of the type described in the above-mentioned copending application Serial No. 613,705.
Fig. 3 illustrates a modification of the apparatus of Fig. 1.

With reference now to the drawings, Fig. 1 shows a magnetic amplifier comprising two saturable magnetic cores 21 and 22. The cores preferably have rectangular hysteresis characteristics which enable them to exist either in the set or the reset magnetic state. Each core carries a pair of oppositely wound windings, the phasing of respective end terminals of the latter being denoted by the conventional dot notation to indicate voltages which are in phase. As shown in the drawings, windings 30 and 33 are connected by means of diodes to junction points 23 and 25 respectively, while windings 31 and 32 are both tied to junction point 24 through individual diodes. It should be pointed out that the above mentioned diodes serve no useful function where only a single magnetic amplifier is pulsed by the driver circuit. Under ordinary conditions, where several magnetic amplifiers are driven from the same source, as shown by connections 38, the diodes serve the function of decoupling between the amplifiers. Each junction point is tied to a positive D.C. source B+ by means of a resistor. Additionally, a clamping diode is connected between each of the aforesaid junction points and ground. As shown in the drawing, the input and output signals appear between points 23 and 25 respectively, and ground. Each core winding is connected to the emitter electrode of one of transistors 15, 16, 17 and 18 respectively. The collector electrode of each of these transistors is connected to one of negative D.C. sources $B_{1L}$—, $B_{2H}$—, $B_{2L}$—, and $B_{1H}$— respectively. The operation of pulse sources 11 and 12 is synchronized as indicated schematically by the broken line connecting them. Each one of these pulse sources is connected to the base of one of transistors 15 and 16 respectively. The waveforms applied to respective transistors in the form of pulse series of alternately positive and negative pulses are labeled $P_{1L}$ and $P_{2H}$ respectively. Similarly, each one of synchronized pulse sources 13 and 14 is connected to the base of one of transistors 17 and 18 respectively, respective pulse series so applied being labeled $P_{2L}$ and $P_{1H}$. Respective pairs of pulse sources 11, 12 and 13, 14 are mutually synchronized with each other, as indicated schematically by the broken connecting line 39 in Fig. 1. The voltage waveforms which comprise the series of driving pulses applied to the core windings from the emitter electrodes are labeled $V_{1L}$, $V_{2H}$, $V_{2L}$ and $V_{1H}$ respectively.

Figs. 2A–2H illustrate the pertinent waveforms which are necessary to form an understanding of the invention. For the purpose of simplification, the dwell period between pulse packets, such as shown in the copending applications referred to above, is omitted here. It will be understood however, that the instant driver circuit is equally adapted to variable frequency operation by the use of this technique. The operation of the magnetic amplifier is set forth in detail in applicat'on S.N. 613,705 and is reiterated briefly below. The application of a negative $V_{1L}$ pulse to winding 30 sets core 21, provided the latter is in the reset state and the input signal is such as to permit current flow in the winding. Simultaneously, current flow due to transformer action in winding 31 is prevented, in the event that core 21 suffers a change of its magnetic state. In the above-mentioned copending applications, the latter operation is carried out by applying a $V_{2H}$ pulse of opposite polarity which renders the diode, which connects winding 31 and junction point 24, non-conductive. These waveforms are illustrated in Figs. 2B and 2D respectively. During the next half cycle the negative $V_{2H}$ pulse resets the core, the simultaneously occurring positive $V_{1L}$ pulse preventing current flow in winding 30 due to transformer action. During the latter time period a negative $V_{2L}$ pulse applied to winding 32 sets core 22, while the simultaneously applied positive $V_{1H}$ pulse prevents current flow in winding 33 due to transformer action. The latter waveforms are illustrated in Figs. 2F and 2H. The subsequently applied negative $V_{2H}$ pulse resets core 22 and produces a direct output signal which corresponds to an amplified input signal.

As explained above, when the magnetic amplifier is pulsed by the power supplies described in the aforesaid application S.N. 612,137, the operation is such that the negative pulses derived from the pulse drivers supply the necessary power, while the positive pulses render the associated diode rectifiers of the core windings non-conductive in order to prevent current flow in the latter. In the driver circuit which forms the subject matter of the present invention, the diodes serve the sole function of decoupling the magnetic amplifiers which are pulsed from the same driver circuit. The function of disconnecting selected core windings is now carried out by a transistor connected to each one of the windings. Accordingly, the negative pulses alone may be considered series of driving pulses which are applied to respective core windings to operate the magnetic amplifiers.

The operation of each of the transistors shown in Fig. 1 is such, that as long as the transistor base is more positive than both the collector and the emitter, the transistor effectively presents an infinite impedance between collector and emitter and hence, between the negative D.C. source and the core winding. Upon the application of a negative pulse from the pulse source to the transistor base, the transistor presents a conductive path between the collector and the emitter and, hence, the negative potential of the D.C. source is applied to the core winding. The termination of the negative pulse derived from the pulse source causes the transistor to revert back to its non-conductive state and terminates the negative potential so applied to the winding. Accordingly, each transistor is used like a switch in order to apply negative pulses to respective core windings during desired time intervals determined by the pulses applied to the transistor base. In a preferred embodiment, the base is pulsed to the same negative potential as that applied to the collector by the negative D.C. source.

Since the operation of all pulse sources is synchronized, the waveforms applied to the respective core windings are similarly synchronized. Specifically, pulse sources 11 and 12 are synchronized so that a positive-going edge of every $P_{1L}$ pulse coincides with a negative-going edge of every $P_{2H}$ pulse. The latter relationship is shown in Figs. 2A and 2C. Similarly, as shown in Figs. 2G and 2E, pulse sources 13 and 14 are synchronized so that a positive-going edge of every $P_{1H}$ pulse occurs simultaneously with a negative-going edge of every $P_{2L}$ pulse. It should be noted that the duration of the positive $P_L$ pulses must be at least as long as that of the corresponding negative $P_H$ pulses. The inverse is equally true, i.e. the positive $P_H$ pulses must be at least as long as the corresponding negative $P_L$ pulses. It will be further seen that respective pairs of pulse sources 11, 12 and 13, 14 are mutually synchronized, so that negative $P_{2L}$ pulses occur within the duration of the negative $P_{2H}$ pulses with the result that windings 31 and 32 are pulsed concurrently.

Figure 2:
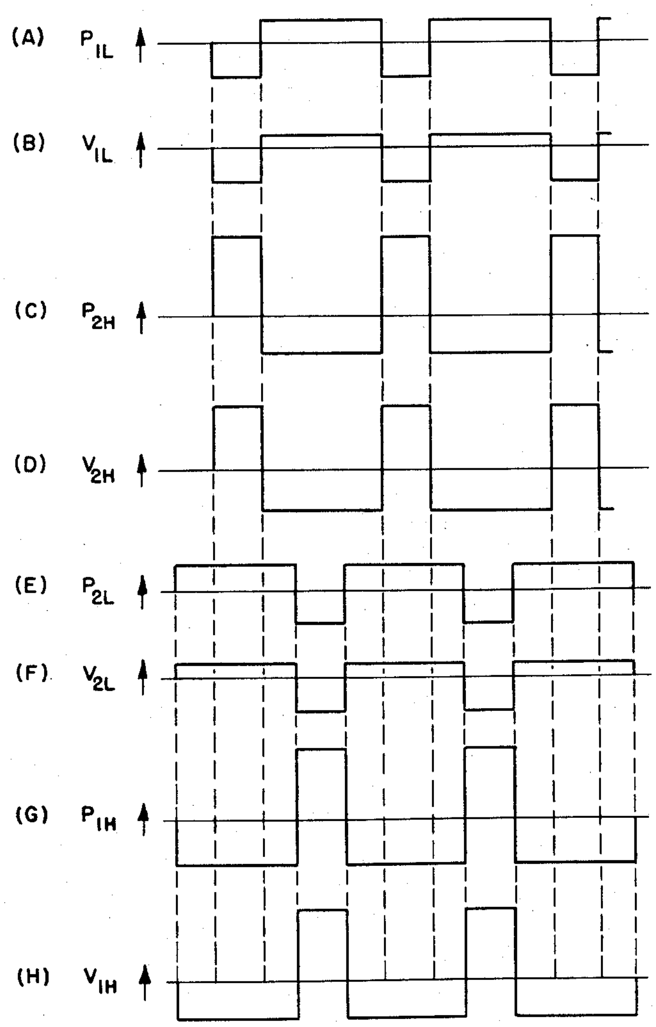
Figs. 2A–2H illustrate some of the waveforms necessary to form an understanding of the operation of the circuit of Fig. 1.

As previously explained, the negative pulses applied to the core windings of each connected magnetic amplifier deliver the power for operating the latter. While one of the windings of the pair of windings on each core is pulsed negatively, the voltage simultaneously appearing on the other winding of the pair does not affect the operation of the amplifier provided its amplitude does not rise above a predetermined level. Thus, while transistor 15 is conductive and a negative pulse is applied to windings 30 from its emitter, current flow in winding 31 due to transformer action is prevented by keeping transistor 16 non-conductive. To this end, the positive excursion of waveform $V_{2H}$, which appears on the emitter of transistor 16 must be kept smaller than the positive $P_{2H}$ pulse which is simultaneously applied to the base of transistor 16. This relationship must be observed for all corresponding V and P waveforms, as shown in Fig. 2. In practice, this is readily accomplished by observing the proper turns ratio between corresponding core windings.

It will be observed that the positive $V_{2H}$ voltage appearing at the emitter of transistor 16 is produced by the transformer action of core 21 when the negative $V_{1L}$ pulse sets the core. In the event that the input signal to core 21 is such as to prevent current flow in winding 30 upon the application of the negative $V_{1L}$ pulse, thereby preventing the setting of the core, no transformer action occurs in the latter. In this case, the theoretical amplitude of the simultaneously occurring $V_{2H}$ pulse is zero. In practice, the amplitude is somewhat above zero due to noise. This condition, which is not shown in Fig. 2, holds true for any magnetic core whenever the applied negative pulse does not produce a change of magnetic state.

Fig. 3 illustrates a modification of the apparatus of Fig. 1 which is applicable to every transistor thereof. The drawing is confined to the circuitry of transistor 15, applicable reference numerals having been carried over. In this embodiment, the negative pulses applied to the base exceed the negative potential applied to the collector by the D.C. source. The base and the collector of transistor 15 are tied together by means of a clamping diode 35. The latter is poled so as to prevent the base potential from becoming more negative than that of the collector. The negative D.C. source $B_{1L}-$ maintains the collector at the desired potential while the diode is cut off. The application of a negative $P_{1L}$ pulse whose amplitude exceeds the potential of the D.C. source, subsequently places the base and the collector at the same negative potential by rendering diode 35 conductive. As in the arrangement of Fig. 1, this action causes the potential of source $B_{1L}-$ to be applied to winding 30 by rendering transistor 15 conductive between its collector and its emitter.

It will be understood that the invention herein described is not confined to the magnetic amplifier illustrated herein, but is applicable to any kind of magnetic core device which requires the application of driver pulses.

Having thus described the invention, it will be apparent that numerous modifications and departures, as explained above, may now be made by those skilled in the art, all of which fall within the scope contemplated by the invention. Consequently, the invention herein disclosed is to be construed as limited only by the spirit and scope of the appended claims.

What is claimed is:

1. In a magnetic amplifier, a driver circuit for supplying a predetermined sequence of driving pulses, said amplifier having a pair of coupled saturable magnetic cores, each of said cores having a rectangular hysteresis characteristic enabling it to exist in one of two magnetic states, each of said cores carrying a pair of windings, said driver circuit comprising a plurality of transistors each having an emitter, a base and a collector, each of said core windings being connected to the emitter of one of said transistors, means for sequentially applying pulses to the base of each transistor, means for applying a negative D.C. potential to the collector of each transistor, each of said transistors presenting a conductive path between its collector and its emitter during the application of respective ones of said last recited pulses, each of said core windings receiving driving pulses during the periods of conductivity of the transistor to which it is connected, said driving pulses having an amplitude equal to the negative D.C. potential on the corresponding collector, means for applying input pulse signals in predetermined synchronism with said pulses to one winding of one of said magnetic cores, and means for deriving output pulse signals in predetermined synchronism with said driving pulses from one winding of the other of said magnetic cores.

2. In a magnetic amplifier having a pair of coupled saturable magnetic cores, a driver circuit for supplying each saturable magnetic core with a pair of series of driving pulses, each of said cores having a rectangular hysteresis characteristic enabling it to exist in one of two magnetic states, a pair of windings carried by each of said cores, said driver circuit comprising a plurality of transistors each having a collector, a base and an emitter, a source of negative D.C. connected to each of said collectors, a pulse source connected to each of said transistors for applying a series of alternately positive and negative pulses to the base thereof, each of said core windings being connected to one of said emitters, each of said positive pulses preventing current flow between the collector and the emitter of the transistor to which it is applied, each of said transistors presenting a conductive path between the collector and the emitter during the application of a negative pulse to its base, each of said core windings receiving a series of negative driving pulses during the periods of conductivity of the transistor to which it is connected, said driving pulses having an amplitude equal to said negative D.C. potential on the transistor collector, means for applying input pulse signals in predetermined synchronism with said pulses to one winding of one of said magnetic cores, and means for deriving output pulse signals in predetermined synchronism with said driving pulses from one winding of the other of said magnetic cores.

3. In a magnetic amplifier, a driver circuit for supplying two pairs of series of driving pulses, each of said magnetic amplifiers comprising a pair of coupled saturable magnetic cores, each of said cores having a rectangular hysteresis characteristic enabling it to exist in one of two magnetic states, a pair of windings carried by each of said cores, said driver circuit comprising two pairs of transistors, each of said transistors having an emitter, a collector and a base, each of said core windings being connected to one of said emitters, a source of negative D.C. potential connected to each of said collectors, two pairs of pulse sources, each of said pulse sources being connected to the base of one of said transistors for applying a series of alternately positive and negative pulses thereto, each pair of pulse sources being synchronized to produce time coincidence between a positive-going edge of the pulses of one series of said pair and a negative-going edge of the pulses of the other series, said pairs of pulse sources being mutually synchronized to provide for the occurrence of the negative pulses of one series of a pair of pulse sources within the duration of the negative pulses of a series of the other pair of pulse sources, each of said positive pulses preventing current flow between the collector and the emitter of the transistor to the base of which it is applied, each of said transistors presenting a conductive path between the collector and the emitter during the application of a negative pulse to its base, each of said core windings receiving a series of negative driving pulses throughout the periods of conductivity of the transistor to which it is connected, said driving pulses having an amplitude equal to the negative D.C. potential on the collector of said transistor, means for applying input pulse signals in predetermined synchronism with said pulses to one winding of one of said magnetic cores, and means for deriving output pulse signals in predetermined synchronism with said driving pulses from one winding of the other of said magnetic cores.

4. The apparatus of claim 3 wherein the amplitude of the negative pulses applied to the base of each of said transistors is equal to the negative D.C. potential on the corresponding transistor collector, and further including means for preventing the potential of each of said emitters from rising above the amplitude of the positive pulses simultaneously applied to the base of the transistor.

5. The apparatus of claim 3 wherein a clamping diode is connected between the collector and the base of each of said transistors, said diode being poled to conduct whenever the amplitude of the applied negative pulses exceeds the negative D.C. potential on the collector, and further including means for preventing the potential of each of said emitters from rising above the amplitude of the positive pulses simultaneously applied to the base of the transistor.

References Cited in the file of this patent

UNITED STATES PATENTS

| | | |
|---|---|---|
| 2,644,892 | Gehman | July 7, 1953 |
| 2,736,765 | Lohman et al. | Feb. 28, 1956 |
| 2,759,142 | Hamilton | Aug. 14, 1956 |
| 2,785,236 | Bright | Mar. 12, 1957 |
| 2,840,726 | Hamilton | June 24, 1958 |

FOREIGN PATENTS

| | | |
|---|---|---|
| 766,210 | Great Britain | Jan. 16, 1957 |

OTHER REFERENCES

Lo, Arthur W. et al.: Transistor Electronics, pub. by Prentice Hall, Inc., Englewood Cliffs, N.J., 1955, chapter 12, pp. 461 and 474 in particular.

Hunter, Lloyd P.: Handbook of Semiconductor Electronics, pub. by McGraw-Hill, 1956.